United States Patent [19]

Malinowski

[11] Patent Number: 4,822,121

[45] Date of Patent: Apr. 18, 1989

[54] ANGULAR SCAN DRIVE SYSTEM HAVING MEANS FOR SELECTIVELY EXTENDING THE RANGE THEREOF

[75] Inventor: Frank R. Malinowski, Santa Barbara, Calif.

[73] Assignee: Santa Barbara Research Center, Goleta, Calif.

[21] Appl. No.: 107,214

[22] Filed: Oct. 31, 1987

[51] Int. Cl.$^4$ ............................................. G02B 26/10
[52] U.S. Cl. ....................................... 350/6.6; 192/71; 192/84 T; 185/29
[58] Field of Search ......................... 350/6.6, 6.5, 320; 192/71, 84 T; 185/29; 310/36, 39

[56] References Cited

U.S. PATENT DOCUMENTS

| | | | |
|---|---|---|---|
| 3,888,562 | 6/1975 | Rushing et al. | 350/6.6 |
| 3,891,299 | 6/1975 | Rushing | 350/6.6 |
| 3,952,217 | 4/1976 | Rawlings | 350/6.6 |
| 4,316,648 | 2/1982 | Lissack | 350/6.6 |
| 4,422,530 | 12/1983 | Denton | 185/29 |

FOREIGN PATENT DOCUMENTS 0017917 7/1980 Japan .................................. 350/6.6

Primary Examiner—Jon W. Henry
Attorney, Agent, or Firm—W. C. Schubert; V. G. Laslo; A. W. Karambelas

[57] ABSTRACT

An angular scan drive system is disclosed which permits the range of motion of a scanning mechanism to be selectively extended. The invention includes a mass (typically the scanning assembly) which is pivotally attached to a frame to scan in an oscillatory motion during a normal course of operation. A spring is included for applying a restoring force between the frame and the mass and, in accordance with the teachings of the invention, a mechanism is included for selectively coupling and decoupling the mass and the frame through the spring. In a particular embodiment, for example, the mechanism decouples the spring from the frame and attaches the free (frame) end of the spring to the mass on command during a specified portion of the scan cycle. Thus, both ends of the spring are attached to the mass thereby removing the restoring force of the spring from the assembly. With the restoring force of the spring removed, the pivotally mounted scanning assembly subsequently scans outside the nominal range to permit the performance of secondary taks until the mechanism is commanded to detach the frame end of the spring from the mass and to recouple it to the frame. At this point, normal operation resumes.

18 Claims, 2 Drawing Sheets

ANGULAR SCAN DRIVE SYSTEM HAVING MEANS FOR SELECTIVELY EXTENDING THE RANGE THEREOF

BACKGROUND OF THE INVENTION

1. Field of the Invention

This invention relates to scanning electro-optical systems. More specifically, the present invention relates to methods and apparatus for extending the scan of an angularly scanning instrument.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof.

2. Description of the Related Art

A resonant oscillatory scan drive system is a simple yet effective scan drive system in that scan drive is effectuated by the pendulum like motion of a pivoted mass. This technique is often used in angularly scanning radiometers and electro-optical instruments because it requires the input of minimal additional energy (i.e. that sufficient to overcome inherent frictional forces) to maintain the oscillatory scanning motion at the resonant frequency.

As with other scanning techniques, the system scans across a scan line over an angular range of 56 degrees, for example, on either side of a zero scan angle (often referred to as the 'nadir' position). Limiting the scanning motion at the end of scan positions may be accomplished by any means including the use of bumper stops or by designing the system so that the pivoted mass does not undergo excursions outside a designated range.

Whatever the technique employed for limiting the scan, a need has been recognized in the art for an angularly scanning system having a selectively extendible scanning range for secondary tasks. One common secondary task is that of calibration. Calibration typically requires the extension of the scanning range to bring a known target within the field of view of the system. Though generally desirable, this full-aperture end-to-end calibration feature has been difficult to implement in the several resonant oscillatory scan drive system approaches that have been investigated to date.

One approach, for example, involves the use of a constant peak amplitude oscillation that nominally substantially overscans the target area. This permits the radiometer instantaneous field of view (IFOV) to cover a calibration target at the end of scan position without blocking the image scene. Unfortunately, this approach forces a trade-off in radiometric resolution and efficiency. (Radiometric resolution may be measured in terms of signal-to-noise ratio (S/N) or the noise equivalent radiance (NEN) which is defined as the amount of radiation that must be received by the system detector assembly to produce an electrical signal equal to the system electrical noise.)

A second conventional approach for providing full-aperture end-to-end radiometric calibration of radiometer using a resonant oscillatory scan drive system involves the lowering of a calibration source into the scanned field-of-view at one end of the scan cycle, whenever calibration is required. This method may be cumbersome to implement in that the calibration target must be lowered and raised every time calibration is required. Also, the calibration target typically blocks part of the image scene so long as it is in place resulting in an undesirable momentary loss of data.

A third approach involves the momentary increase in the maximum scan angle of the system such that it overscans the target scene and looks at a calibration target when a calibration task is to be accomplished. This approach is undesirable for at least three reasons. First, it requires the addition of power to the scanning mechanism to increase the peak amplitude of the scan and again to reduce the peak amplitude to its original value. Secondly, the scan drive and affected subsystem must be designed to accommodate the additional stresses associated with the added power and the resulting increased oscillatory amplitude. Finally, the image scene data is adversely affected until the scan drive is returned to the normal scan amplitude operation.

Thus, there is a need in the art for an angular scan drive system having means for selectively extending the range thereof which does not compromise performance and which does not require a significant addition of power.

SUMMARY OF THE INVENTION

The need in the art is addressed by the angular scan drive system of the present invention which permits the range of motion of a scanning mechanism to be selectively extended. The invention includes a mass (typically the scanning assembly) which is pivotally attached to a frame to scan in an oscillatory motion during a normal course of operation. A spring is included for applying a restoring force between the frame and the mass and, in accordance with the teachings of the invention, a mechanism is included for selectively coupling and decoupling the mass and the frame through the spring. In a particular embodiment, for example, the mechanism decouples the spring from the frame and attaches the free (frame) end of the spring to the mass on command during a specified portion of the scan cycle. Thus, both ends of the spring are attached to the mass thereby removing the restoring force of the spring from the assembly. With the restoring force of the spring removed, the pivotally mounted scanning assembly subsequently scans outside the nominal range to permit the performance of secondary tasks until the mechanism is commanded to detach the frame end of the spring from the mass and to recouple it to the frame. At this point, normal operation resumes.

DESCRIPTION OF THE INVENTION

As disclosed herein with reference to an illustrative resonant oscillatory scan drive system, the present invention provides a method and apparatus for selectively extending the peak angular excursion or range of an angular scan drive system. Further, the present invention provides a method and apparatus for selectively returning the system to an initial operating range with no substantial change in angular velocity. In effect, the present invention changes the angular velocity of an angular scan drive, which varies as a function of scan angle, to a constant angular velocity at a specified position in the scan cycle. The constant angular velocity will be essentially the same as that which existed at the time of the transformation from the varying to the constant angular velocity so long as the inertia associated with the transformation mechanism is small compared to the angular momentum of the scanning assembly. The transformation is accomplished in a manner that permits the scan amplitude to exceed the normal limiting peak amplitude of the basic sinusoidal or resonant scan drive. In addition, when the scan drive of the present invention is retracing its path from its extended peak position at the constant angular velocity, the system will change the constant angular velocity back to that associated with the basic resonant scan drive at the scan angle at which the transformation to the constant angular velocity occurred.

The present invention thus permits the maximum scan angle to be selectively extended, for as many scan cycles as necessary to perform secondary tasks, without significantly affecting the nominal operation of the system and without the significant addition of power.

The advantageous operation of the present invention is afforded by an angular scan drive consisting of a mass (typically the scanning assembly) which is pivotally attached to a frame and actuated by a spring, attached between the mass and the frame, to sustain oscillatory or pendulum like motion. A particularly novel and unique feature of the present invention is the provision of means for: (1) selectively detaching one end of the spring from the either the frame or the mass and, at substantially the same time, attaching it to the mass or frame respectively, and (2) subsequently reattaching it to the frame or mass respectively as the pivoted mass retraces its path from the resulting extended peak angular excursion.

Figure 1:
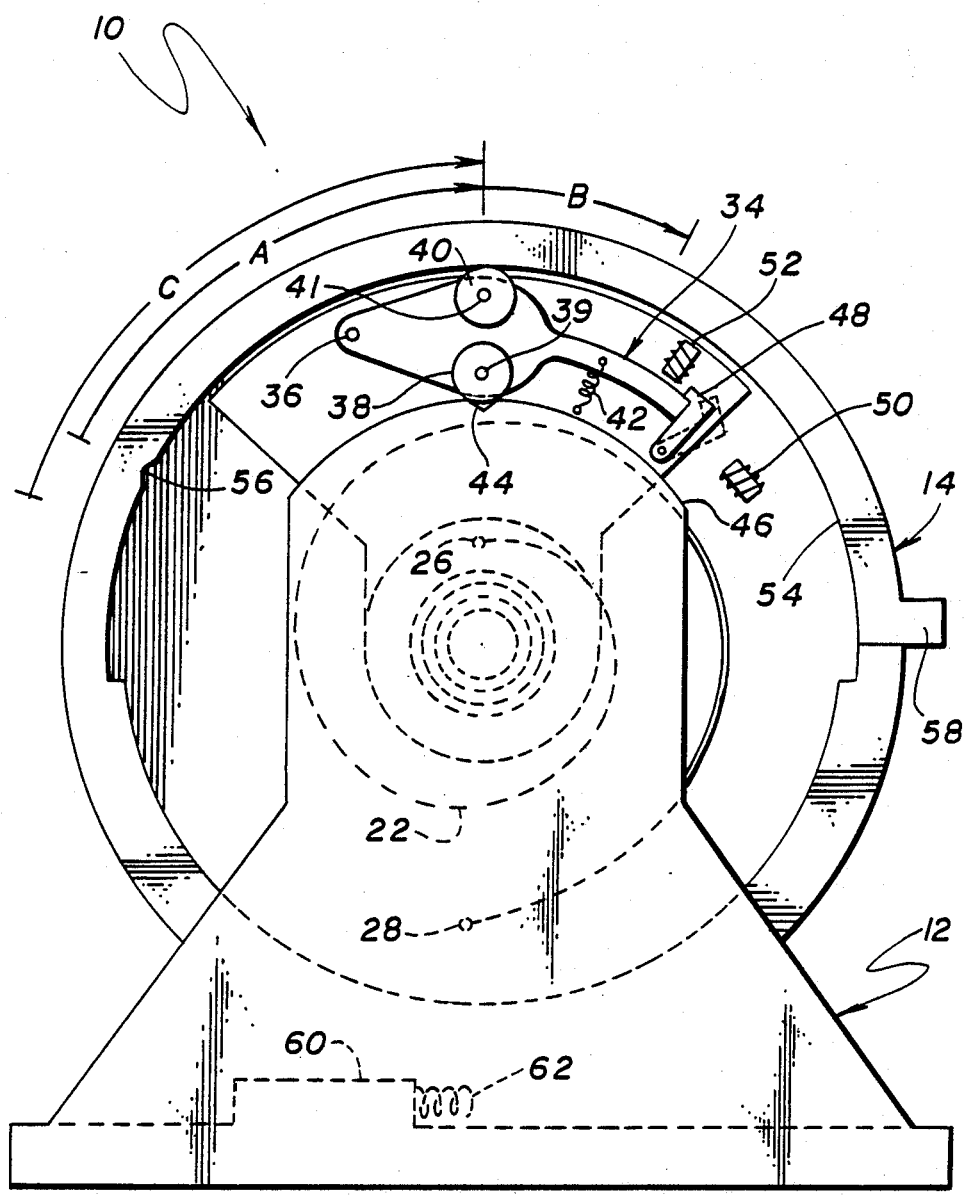
FIG. 1 is a front view of an illustrative embodiment of the present invention.
Figure 2:
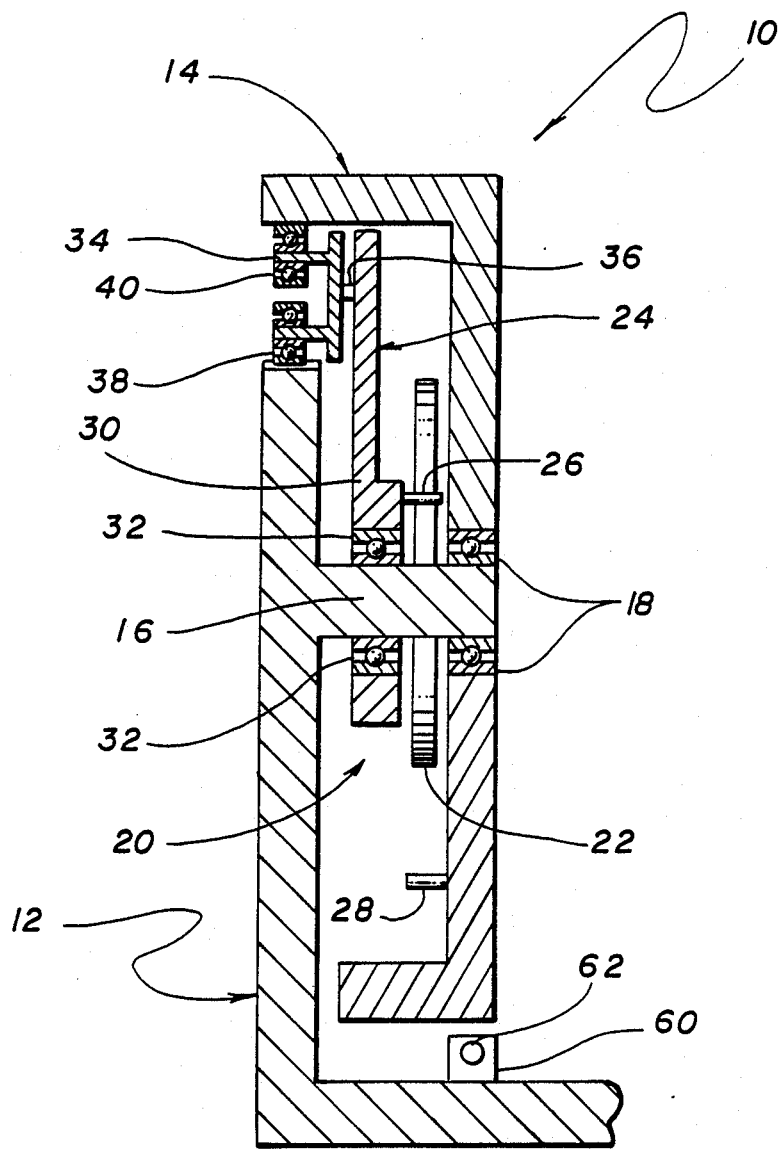
FIG. 2 is a side view of an illustrative embodiment of the present invention.

FIGS. 1 and 2 show front and side views respectively of an illustrative embodiment of a scan drive system 10 constructed in accordance with the teachings of the present invention. The scan drive system 10 includes a main frame 12 which is either integral with or rigidly attached to a supporting frame. An annular mass 14 is mounted for pivotal movement about a shaft 16 which extends from the frame 12. See FIG. 2. A bearing 18 is included to minimize friction as the mass 14 rotates about the shaft 16. The mass 14 represents, or is adapted for attachment to, a scanning assembly, which might include a detector or array of detectors or an optical mirror (not shown), as will be appreciated by those skilled in the art. The illustrative implementation of the spring means of the present invention 20 is shown generally as including a coil spring 22 and coupling means consisting essentially of a selectively actuatable latching mechanism 24. The spring 22 is attached to the latching mechanism 24 by a first pin 26 and to the pivotal mass 14 by a second pin 28.

The latching mechanism 24 includes a fixture 30 which is also mounted for pivotal movement about the shaft 16 on a bearing 32. The frame 12, the annular mass 14 and the fixture 30 may be made of any suitably rigid material as is known in the art. As best illustrated in FIG. 1, a latch 34 is pivotally attached to the fixture 30 at a pin 36. The latch 34 has a tadpole shape with the pin 36 at the head, first and second ball bearings 38 and 40 in parallel coplanar relation on one side near the widest part of the body thereof, and a tail portion to which a spring 42 is attached. The ball bearings 38 and 40 may be made of metal or other suitable material. The bearings 38 and 40 are mounted for rotation about pins 39 and 41 respectively. The spring 42 exerts a force on the tail of the latch 34 which is effective to move it into a first (hold) position in which the first ball bearing 38 engages a first detent 44 in the frame 12. The detent 44 is shaped to receive and retain the ball bearing 38. A first circular track 46 is provided on the frame 12 for bearing 38. A second latch 48 is pivotally attached to the fixture 30 for retaining the first latch 34 in the hold position in the detent 44 of the frame 12. The second latch 48 is retained in the first position by a coil spring (not shown). In this position, the pivotal mass 14 engages in a varying angular velocity motion or scan over a nominal scanning range.

A first solenoid 50 is mounted on the fixture 30 for selectively actuating, on receipt of a command signal from a suitable control system (not shown), the second latch 48 from the hold position to a second (release) position (shown in phantom). A second solenoid 52 is mounted on the fixture 30 for subsequently attracting the first latch 34, on command, to a second (release) position. In the release position, the outer race of the second ball bearing 40 is initially pressed against a second circular track 54, in the mass 14. However, the distance between the outer race surfaces of bearings 38 and 40 is greater than the distance between concentric circular tracks 46 and 54 and thus bearing 38 is prevented from initially rolling out of the first detent 44. As the mass 14 rotates, the second ball bearing 40 travels in the track 54 for an angular displacement 'A' until it rolls into a second detent 56, in the pivotal mass 14. At this time the first bearing 38 rolls out of the detent 44 and the spring 22 is decoupled from the frame 12. As such, the spring 22 no longer exerts a restoring force between the frame 12 and the mass 14. The mass 14 subsequently traverses an angular displacement 'B' at a constant angular velocity, until a bumper 58 extending from the mass 14 engages a bumper stop 60 on the frame 12 (see FIG. 2).

The constant angular velocity is substantially equal to the angular velocity of the pivotal mass at the time of the (non-constant to constant) angular velocity transformation, assuming that the moment of inertia of the fixture and associated latching mechanism is small compared to the moment of inertia of the rotating mass 14 and assuming that the bearing frictional forces are also small. Note that the distance $A+B$ is greater than the angular displacement 'C' which represents the nominal excursion of the mass 14 when the first ball bearing 38 is seated in the first detent 44. Thus, the system 10 now has an extended angular peak amplitude.

It should also be noted that once the second bearing 40 has rolled into the second detent 56 and the first bearing 38 is at any position along the first track 44, except that of the first detent position 44, the second bearing 40 will remain in the second detent 56. That is, the second bearing 40 will remain in the second detent 56 even if the second solenoid 52 is deactivated and the action of the spring on the tail of the latch 34 presses the outer race of the first bearing 38 against the first track 46. As stated above, this is due to the advantageous design of the present invention in which the distance between the outer race surfaces of bearings 38 and 40 is greater than the distance between the concentric circular tracks 46 and 54. Thus, after the non-constant to constant angular velocity transformation has been effected, the second solenoid 52 may be deactivated and the spring 22 will remain decoupled from the frame 12 and coupled to the mass 14 as long as the first bearing 38 is not aligned with the first detent 44.

The bumper stop 60 is fitted with a spring 62 which reverses the direction of movement of the mass 14 at approximately the same angular velocity at which it engaged the spring 62.

After the direction of the mass is reversed and before the first bearing 38 becomes aligned with the first detent 44, the second solenoid 52 is deactivated. This action results in: (1) the outer race of the first bearing 38 pressing against first track 46 and rolling into the first detent 44 when the first bearing 38 and the first detent 44 become aligned, and (2) the second bearing 40 rolling out of the second detent 56 at the time of the alignment of the first bearing 38 with the first detent 44. Thus, the spring 22 is reattached to the frame 12 and normal oscillatory scanning motion is resumed with the normal peak amplitude for the reverse segment of the scan cycle.

If more than one consecutive extended scan amplitude is required, the process of activating and deactivating the second solenoid 52 is repeated during the following scan cycles until the total number of consecutive extended peak amplitudes required is achieved. At this point, both the first and second solenoids 50 and 52 respectively, are deactivated and, following the seating of the first bearing 38 into the first detent 44, the first latch 34 is latched in place by the second latch 48. The mass 14 thereafter resumes oscillatory scanning motion at the nominal varying angular velocity with normal peak amplitude for all the following scan cycles.

Thus, the present invention has been described herein with reference to illustrative embodiment for a particular application. Those having ordinary skill in the art and access to the teachings provided herein will recognize additional modifications, applications and embodiments within the scope thereof. For example, the invention is not limited to the spring means, particularly the latching mechanism, shown. Those skilled in the art will recognize that any suitable latching and spring mechanism may be used without departing from the scope of the invention. Further, the invention is not limited to the attachment and detachment of the latching mechanism to the frame. That is, the detachment may instead be from the mass without departing from the invention. The invention is also not limited to scanning applications. The invention may be used in any application where it is necessary or desirable to selectively extend the peak angular excursion of a pivoted mass.

It is intended by the appended claims to cover any and all such applications, modifications, and embodiments.

Accordingly,

What is claimed is:

1. An angular scan drive system comprising:
a main frame;
a mass pivotally attached to said frame; and
spring means for applying an angle limiting restoring force between said frame and said mass, said spring means including coupling means for selectively coupling and decoupling said mass and said frame, during the scanning motion of said scan drive system, through said spring means, whereby the range of motion of said mass is selectively extended thereby.

2. The angular scan drive system or claim 1 wherein said spring means includes a first spring and said coupling means includes a selectively actuatable latching mechanism attached to said first spring.

3. The angular scan drive system of claim 2 wherein said selectively actuatable latching mechanism includes a fixture, a first latch pivotally attached to said fixture, and first means for retaining said first latch in a first position and selectively actuatable second means for moving said first latch to a second position.

4. The angular scan drive system of claim 3 wherein said first means is a second spring attached between said first latch and said fixture.

5. The angular scan drive system of claim 4 wherein said second means is a solenoid.

6. The angular scan drive system of claim 5 wherein said first position is in contact with said frame and said second position is in contact with said mass.

7. The angular scan drive system of claim 5 wherein said first position is in contact with said mass and said second position is in contact with said frame.

8. The angular scan drive system of claim 7 wherein said first means includes a second latch pivotally attached to said fixture for retaining in a first position said first latch in said first position.

9. The angular scan drive system of claim 8 wherein said second means includes means for selectively moving said second latch to a second position at which said first latch is released.

10. The angular scan drive system of claim 9 wherein said means for selectively moving said second latch to a second position is a second solenoid.

11. The angular scan drive system of claim 5 wherein said fixture is pivotally attached to said frame.

12. The angular scan drive system of claim 1 including a bumper and bumper stop means attached to said frame and said mass for reversing the direction of motion of said mass at a predetermined end of scan range thereof.

13. The angular scan drive system of claim 3 wherein said first latch includes first and second ball bearings for rolling engagement with said frame and said mass respectively.

14. The angular scan drive system of claim 13 wherein said frame and said mass include first and second detent means for retaining said first and second ball bearings respectively.

15. The angular scan drive system of claim 14 wherein said first and second detent means includes first and second detents and second tracks for retaining said first and second ball bearings respectively.

16. An angular scan drive system comprising:
a main frame;
a mass pivotally attached to said frame; and
spring means for applying a force between said frame and said mass, said spring means including coupling means for selectively coupling and decoupling said mass and said frame through said spring means whereby the range of motion of said mass is selectively extended thereby,
said spring means further including a first spring and said coupling means including a selectively actuatable latching mechanism attached to said first spring, said selectively actuatable latching mechanism including
a fixture pivotally attached to said frame,
a first latch pivotally attached to said fixture, said first latch including first and second ball bearings for rolling engagement with said frame and said mass respectively,
first means for retaining said first latch in a first position, selectively actuatable second means for moving said first latch to a second position, and first and second detent means disposed on said frame and said mass respectively for retaining said first and second ball bearings respectively; and a bumper and bumper stop means attached to said frame and said mass for reversing the direction of motion of said mass at a predetermined end of scan range thereof.

17. A method for extending the scan of an angular scanning instrument having a mass pivotally mounted on a frame and a spring attached at a first end to said frame and at at a second end to said mass for applying a restoring force therebetween, said method including the steps of:

(a) selectively decoupling said spring from said frame at said first end thereof;

(b) coupling said first end of said spring to said mass;

(c) selectively decoupling said first end of said spring from said mass; and (d) recoupling said first end of said spring to said frame.

18. A method for extending the scan of an angular scanning instrument having a mass pivotally mounted on a frame and a spring attached at a first end to said frame and at at a second end to said mass for applying a restoring force therebetween, said method including the steps of:

(a) selectively decoupling said spring from said mass at said second end thereof;

(b) coupling said second end of said spring to said frame;

(c) selectively decoupling said second end of said spring from said frame; and (d) recoupling said second end of said spring to said mass.

* * * * *